March 25, 1952     A. Y. DODGE     2,590,690
FRICTION BRAKE FOR WHEELED VEHICLES Filed Jan. 31, 1946     3 Sheets-Sheet 1

Inventor:
Adiel Y. Dodge,
By Dawson, Brothers Spangenberg,
Attorneys.

March 25, 1952 A. Y. DODGE 2,590,690
FRICTION BRAKE FOR WHEELED VEHICLES
Filed Jan. 31, 1946 3 Sheets-Sheet 2

Inventor:
Adiel Y. Dodge,
By Dawson, Booth and Spangenberg,
Attorneys.

March 25, 1952     A. Y. DODGE     2,590,690
FRICTION BRAKE FOR WHEELED VEHICLES
Filed Jan. 31, 1946     3 Sheets-Sheet 3

Patented Mar. 25, 1952

2,590,690

UNITED STATES PATENT OFFICE 2,590,690

FRICTION BRAKE FOR WHEELED VEHICLES

Adiel Y. Dodge, Rockford, Ill.

Application January 31, 1946, Serial No. 644,459

17 Claims. (Cl. 188—78)

1

This invention relates to brakes and more particularly to heavy duty automotive brakes.

It has heretofore been the usual practice to employ expanding two shoe brakes for heavy duty automotive purposes. Commonly one of the shoes has self-actuating characteristics and the other has deactuating characteristics. In brakes of this type the maximum extent of lining which can be profitably employed on one brake is 220 degrees, and since the shoes have different characteristics, they do not wear the lining to good advantage. Furthermore, since the shoes engage the drum with different degrees of force, they tend to deflect the drum out of round during heavy applications and impose an unbalanced load on the wheel bearings. It is one of the objects of the present invention to provide a brake in which these several disadvantages of conventional two shoe brakes are eliminated.

Another object is to provide a brake in which the pressure on the shoes is more nearly uniform throughout the circumference of the brake to improve lining wear characteristics to produce uniform expansion stresses in the drum and to balance the radial loads against the drums.

Still another object is to provide a brake which can easily and quickly be adjusted to compensate for lining wear. According to one feature of the invention, the brake is so constructed that minimum or no adjustment of the cam or other actuating device is required.

Still another object is to provide a brake which is easy to assemble and disassemble and which comprises a minimum number of parts.

A specific object is to provide a brake in which the shoes are moved by separate levers lying within and connected to the shoes.

The above and other objects and advantages of the invention will be more readily apparent from the following description when read in connection with the accompanying drawing, in which—

Figure 4 is a view similar to Figure 1 of an alternative construction.

As shown, the brake is adapted to be used with a cylindrical brake drum 10 providing an inner cylindrical drum surface and which may be attached to the vehicle wheel in any desired manner. The brake comprises a support 11 of channel or C section fixedly mounted within the drum 10. It will be understood that the channel 11 may be cut away at various points, as desired, to provide access to the mechanism and to lighten the assembly.

Figure 1:
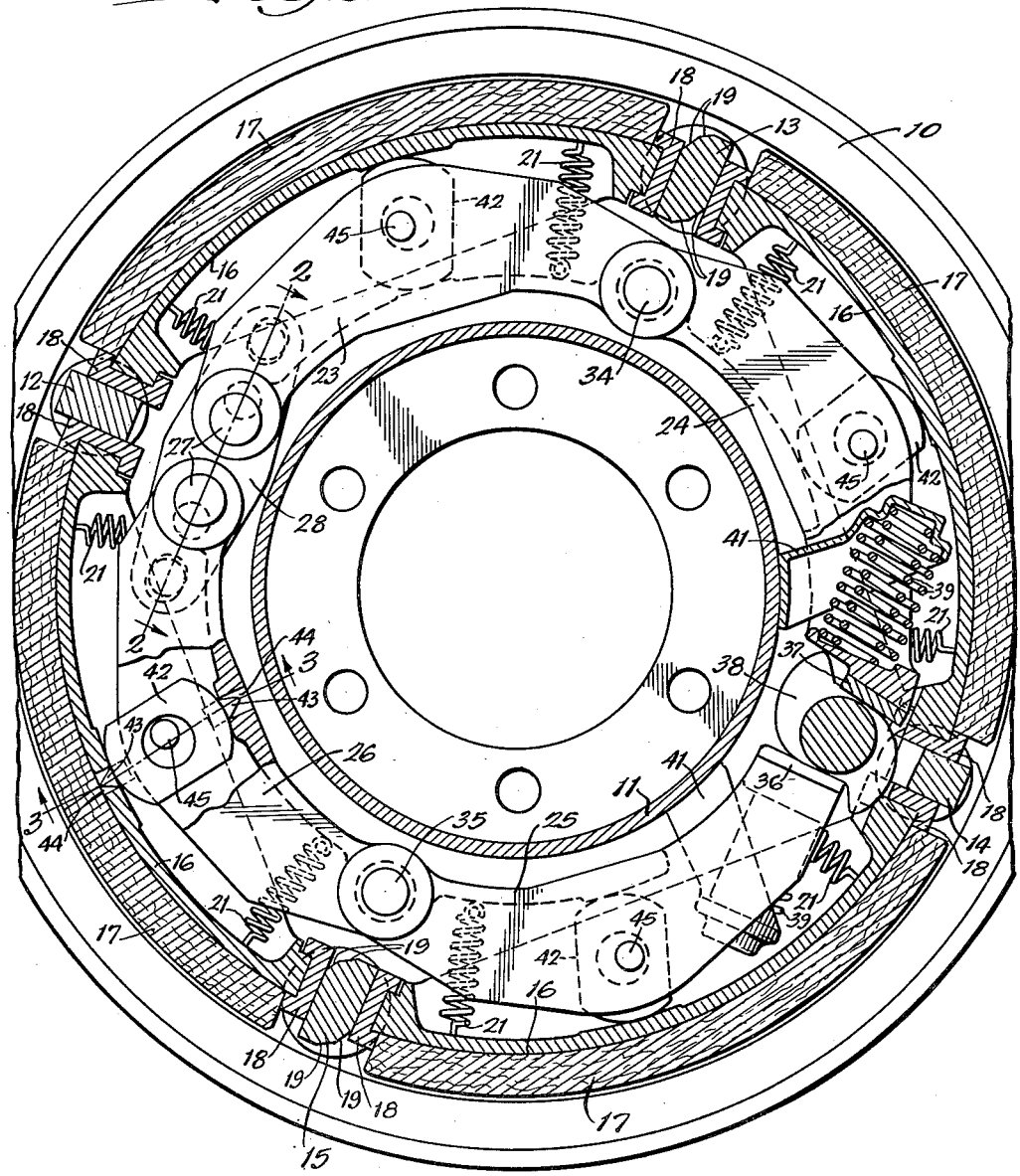
Figure 1 is a axial section through a brake embodying the invention showing a portion of the drum in elevation.
Figure 3:
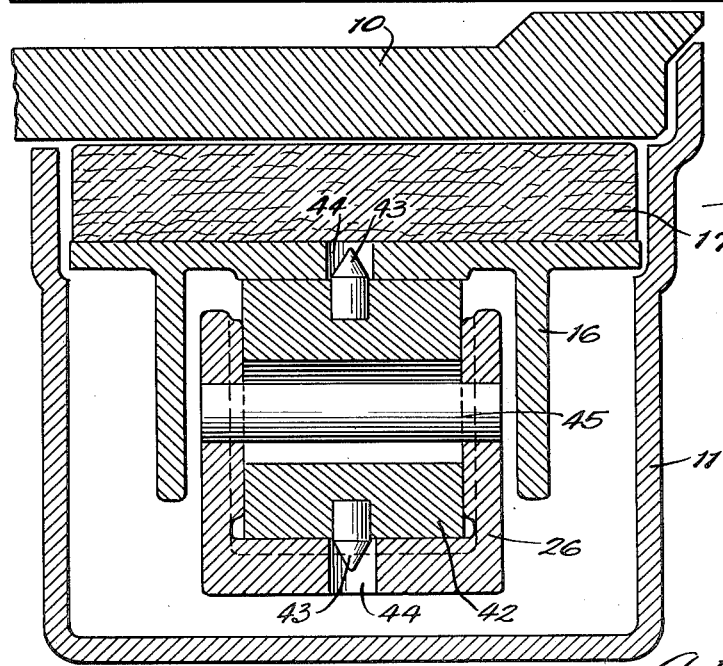
Figure 3 is an enlarged partial section on the line 3—3 of Figure 1.

The support 11 carries a series of abutments 12, 13, 14 and 15 equally spaced throughout the circumference of the brake. Between the adjacent pairs of abutments there are mounted brake shoes 16 which may be identical in construction and which are preferably of channel section, as best seen in Figure 3, with the channels opening inward. The shoes carry brake lining 17 adapted to engage the drum 10 when the shoes are expanded outward toward the drum. At their ends the shoes carry bearing plates 18 adapted to engage the several abutments, as shown, to limit inward movement of the shoes. To adjust the initial clearance between the shoes and the drum, at least two of the abutments are made adjustable. As shown, the opposite abutments 13 and 15 are mounted for rotation in the support and are formed with symmetrical spiral curves on their opposite sides which are preferably made up of a series of connected flats 19 to increase the bearing area against the plates 18. As the abutments 13 and 15 are turned counter-clockwise, as seen in Figure 1, their effective circumferential width will increase to spread the shoes, thereby to take up clearance between the shoes and the drum. The abutments 12 and 14 may be made fixed since no adjustment at these points is necessary. The shoes are urged inward toward engagement with the abutments by springs 21 engaging the shoes adjacent their corners and connected to pins 22 carried by the support 11.

The shoes are adapted to be moved out into engagement with the drum by a series of levers 23, 24, 25 and 26. As best seen in Figure 3, the levers are preferably of channel section with the channels opening outward and are nested within the brake shoes 16. The adjacent ends of the levers 23 and 26 are pivoted on eccentric pivots 27 which are rotatably supported in a supporting plate 28 for rotation therein. The plate 28 is formed in its end portions with slots receiving bolts 29 which extend through the support 11 so that the plate 28 can be adjusted circumferentially on the support. By turning the pivots 27 in the plate, the ends of the levers 23 and 26 can be moved circumferentially together or apart to adjust the levers. The pivots 27 are held in adjusted position by locking nuts 31 and a locking plate 32 engaging non-circular heads on the pivots and held in place by a screw 33.

The adjacent ends of the levers 23 and 24 are connected by a pivot 34, and the adjacent ends of levers 25 and 26 are similarly connected by a pivot 35. The ends of the levers 24 and 25 carry cam follower plates 36 and 37 which engage an actuating cam 38 rotatably supported on the support 11. As shown, the follower plate 36 lies parallel to a radial line through the center of the cam while the follower plate 37 lies at an acute angle to this line to equalize the frictional effect on the cam plates upon rotation of the cam, as more particularly described and claimed in my copending application Serial No. 638,166, filed December 29, 1945, now matured into Patent No. 2,518,761, issued August 15, 1950. The shoes 24 and 25 are held against the cam by springs 39 lying within the channel shaped shoes and engaging brackets 41 carried by the support 11.

To connect the shoes and levers so that the shoes will be moved outward into engagement with the drum when the levers are spread, rollers 42 are provided rolling on cylindrical surfaces provided on the shoes and levers in the central parts thereof. As shown, the rollers 42 are cut away at their sides leaving arcuate ends to roll against the shoes and levers which are of sufficient arcuate extent to take care of any expected movement. To prevent the rollers from sliding on the levers and shoes and to hold them properly positioned relative thereto, reduced projections 43 are provided on the opposite ends of the rollers to fit into openings 44 in the levers and shoes. With this construction, the projections 43 act in the manner of gear teeth to prevent slipping or displacement between the rollers and the shoes and levers so that the rollers will be properly positioned at all times. The rollers are held against displacement from the levers during assembly and at times when the shoes are removed by pins 45 extending loosely through enlarged openings in the rollers. The pins and openings are of such a size that the pins do not normally engage the openings so that they will not interfere with true rolling of the rollers and will function only to prevent the rollers from falling away from the levers during assembly and handling.

In operation when the cam 38 or other actuating means is operated to spread the ends of the levers 24 and 25, all of the levers will swing about their pivots to move radially outward. Through the rollers 42 the levers will cause the shoes to move out into engagement with the drum to produce a brake application. Since the levers are pivotally interconnected, it will be noted that the force exerted on each of the brake shoes is equal so that a uniform application throughout the circumference of the brake will result. Since the shoes are urged outward at their central portions, each shoe is mildly self-actuating in either direction of rotation of the drum to produce a highly efficient brake. Upon returning the cam to its release position, the levers will be moved back inward by the springs 39, and the shoes will be moved uniformly away from the drum by the springs 21.

To balance the brake initially, the plate 28 is preferably loosened and the brake is applied so that the plate 28 will center itself with respect to the cam. At this time the bolts 29 holding the plate may be tightened so that the plate will be accurately positioned to produce uniform movement of the levers and shoes on opposite sides of the assembly.

As the lining wears, the adjustable abutments 13 and 15 can be turned to move the shoes outward so that the clearance can be maintained within the desired limits. At the same time the pivots 27 are preferably adjusted to move the levers outward so that the levers and shoes will both be maintained at all times in contact with the rollers 42.

Figure 2:
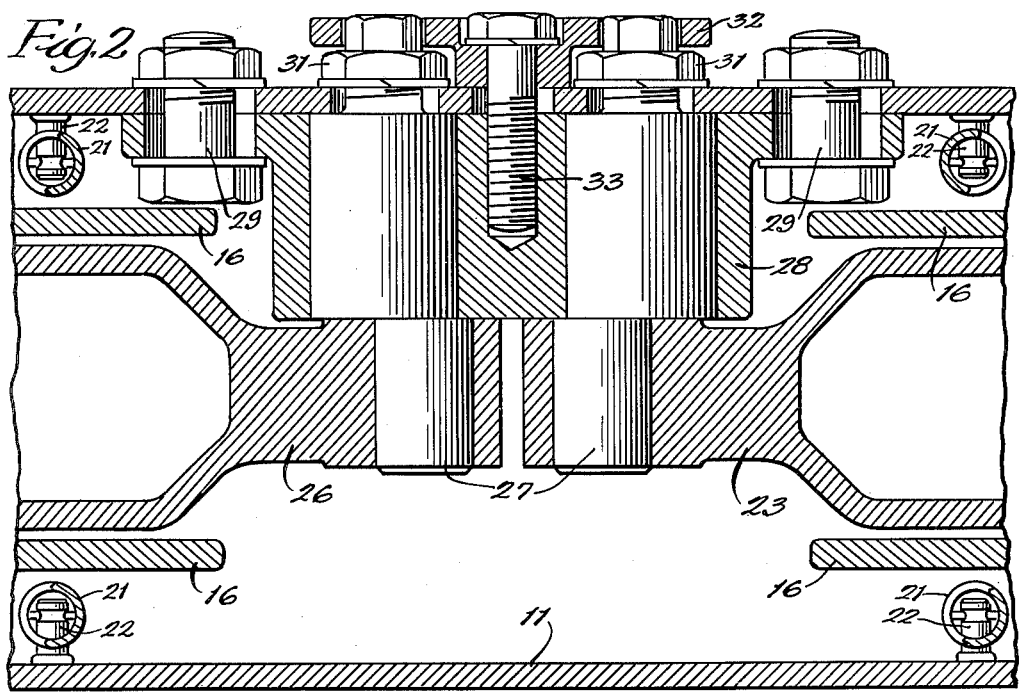
Figure 2 is an enlarged partial section on the line 2—2 of Figure 1.

Figure 4 illustrates a construction similar to that of Figures 1 to 3 except that three rather than four shoes are employed. Since this construction provides all of the advantages of the four shoe construction with a smaller number of parts, it may be considered the preferred construction. In this construction the drum is illustrated at 50 and a support 51 similar to the support 11 is concentrically mounted within the drum. The support 51 carries a fixed abutment 52 and adjustable abutments 53 and 54. The abutment 53 is formed with an arcuate portion 55 which may be made up of a series of connected flats and with a spiral portion 56 similarly made up of a series of connected flats. The abutment 54 is formed with two similar spiral portions 57 both shown as made up of a series of connected flats to increase bearing area.

Three shoes 58 similar to the shoes 16 of Figures 1 to 3 are mounted between the abutments with their ends adapted to engage the abutments, as shown. The shoes are adapted to be moved into engagement with the drum by three levers, 59, 60 and 61 lying radially within the shoes. The ends of the levers 59 and 61 are pivoted on eccentrically adjustable pivots 62 carried by a plate 63 which is similar to the plate 28 of Figures 1 to 3. The levers 59 and 60 are connected by a pivot 64 and the levers 61 and 60 engage an actuating cam 65. Springs 66 are provided to hold the levers in engagement with the cam. Since the cam operates only one shoe at one side and two shoes at its other side, it is preferably made unbalanced, as shown, so that the rise on one side of the cam is double that on the opposite side of the cam. Therefore, as the cam is turned counter-clockwise, as seen in Figure 4, it will move the end of the lever 60 circumferentially through twice the distance it moves the end of the lever 61. In this way radial movement of the several levers is equalized to produce uniform braking pressure throughout the circumference of the brake. The levers are connected to the shoes by rollers 67 similar to the rollers 42 of Figures 1 to 3.

In operation of this brake, when the cam is turned the lever 61 will be moved about its pivot 62 to move the corresponding shoe 58 outward to engage the drum. At the same time both levers 59 and 60 will be moved outward an equal amount to move their corresponding shoes into engagement with the drum. As the lining wears, the adjustable abutments 53 and 54 can be turned counter-clockwise, the abutment 54 spreading the adjacent ends of the shoes equal amounts while the abutment 53 moves only the shoe between it and the fixed abutment 52 due to the fact that the portion 55 of abutment 53 is arcuate. In this way the adjustments of the several shoes are made equal, equally to take up clearance between them and the brake drum. At the same time the adjustable pivots 62 are turned correspondingly to move the levers outward to maintain them and the shoes in constant engagement with the rollers 67. Since the movement of the pivot connected to the lever 61 is only half that required for the pivot connected to the lever 59, the first named pivot need be turned only half as much or, if preferred, it can be given one half the eccentricity and may be turned the same amount.

While two embodiments of the invention have been shown and described in detail, it will be understood that these are illustrative only and are not to be taken as a definition of the scope of the invention, reference being had for this purpose to the appended claims.

What is claimed is:

1. A brake comprising a series of fixed abutments, a series of shoes mounted between the abutments, a plurality of pivoted levers lying radially within the shoes, means to spread the levers whereby they move radially outward, and rollers engaging the central parts of the shoes and the levers to urge the shoes outward when the levers are spread, the rollers having relatively narrow projections thereon fitting into openings in the shoes and levers to prevent slipping of the rollers relative to the shoes and levers.

2. A brake comprising a series of at least three fixed abutments, a series of shoes lying between the abutments, a plurality of pivotally interconnected levers lying radially within the shoes, means forming a fixed mounting for one of the pivotal interconnections between the levers the other pivotal interconnections between the levers being free to move, means to swing the levers radially outward around the last named pivotal interconnection, and rollers engaging the central parts of the shoes and the levers to urge the shoes outward as the levers are swung outward.

3. A brake comprising a series of at least three fixed abutments, a series of shoes lying between the abutments, a plurality of pivotally interconnected levers lying radially within the shoes, means forming a fixed mounting for one of the pivotal interconnections between the levers the other pivotal interconnections between the levers being free to move, means to swing the levers radially outward around the last named pivotal interconnection, the levers being equal in number to the shoes and registering with the shoes respectively, and a roller engaging the central parts of each lever and its corresponding shoe to urge the shoes out when the levers are swung outward.

4. A brake comprising a series of fixed abutments, a series of shoes lying between the abutments, a pair of relatively adjustable pivots, levers pivoted on the pivots respectively at one end, means to separate the other ends of the levers to spread them radially, the pivots being adjustable circumferentially to adjust the radial positions of the levers, and rollers engaging the central parts of the levers and shoes respectively, the rollers having relatively narrow projections thereon fitting into openings in the levers and shoes.

5. A brake comprising a series of fixed abutments, a series of shoes lying between the abutments, a pair of relatively adjustable pivots, levers pivoted on the pivots respectively at one end, means to separate the other ends of the levers to spread them radially, a plate on which the pivots are adjustably supported, means for securing the plate in any one of a plurality of adjusted positions, and means connecting the central parts of the levers and shoes respectively to move the shoes out when the levers are spread.

6. A brake comprising a support, a plurality of abutments on the support including at least one fixed abutment and two adjustable abutments which are adjustable to vary their circumferential spacing, a plurality of shoes equal in number to the abutments lying between the abutments, and adapted to engage adjacent abutments at their ends, a plurality of pivotally interconnected levers radially within the shoes, means to separate the ends of adjacent levers to spread the levers radially, and rollers engaging the central parts of the shoes and the levers to move the shoes out as the levers are spread.

7. A brake comprising a support, a plurality of abutments on the support including at least one fixed abutment and two adjustable abutments which are adjustable to vary their circumferential spacing, a plurality of shoes equal in number to the abutments lying between the abutments and adapted to engage adjacent abutments at their ends, a plurality of pivotally interconnected levers radially within the shoes, means on the support to secure one of the pivotal interconnections between the levers, means spaced from the last named means to separate the ends of adjacent levers to spread the levers radially, and rollers engaging the central parts of the shoes and the levers to move the shoes outward as the levers are spread.

8. A brake comprising a support, a plurality of abutments on the support including at least one fixed abutment and two adjustable abutments which are adjustable to vary their circumferential spacing, a plurality of shoes equal in number to the abutments lying between the abutments and adapted to engage adjacent abutments at their ends, a plurality of pivotally interconnected levers radially within the shoes, means on the support to secure one of the pivotal interconnections between the levers, a rotatable cam on the support spaced from the last named means and engageable with the ends of adjacent levers to spread the levers radially, and rollers engaging the central parts of the shoes and the levers to move the shoes outward as the levers are spread.

9. A brake comprising a support, a series of abutments carried by the support, a series of channel section shoes lying between the abutments each having an arcuate web carrying a friction lining and integral side flanges extending radially inward from the sides of the web, a series of pivotally interconnected channel section levers nested within the shoes with their channels opening outward, a cam rotatable on the support engaging the ends of adjacent levers to spread the levers, springs lying in the channels of the levers and engaging the support to urge the ends of the levers against the cam, and rollers lying in the channels of the levers connecting the levers to the central parts of the shoes.

10. A brake comprising a support, a series of abutments carried by the support, a series of channel section shoes lying between the abutments with the channels opening inward, a series of pivotally interconnected channel section levers nested within the shoes with their channels opening outward, a cam rotatable on the support engaging the ends of adjacent levers to spread the levers, springs lying in the channels of the levers and engaging the support to urge the ends of the levers against the cam, rollers lying in the channels of the levers connecting the levers to the central parts of the shoes, interfitting parts on the rollers and the levers and shoes to prevent sliding of the rollers relative to the levers and shoes, and pins carried by the levers extending loosely through openings in the rollers to prevent displacement of the rollers from the levers.

11. A brake comprising a support, four abutments carried by the support, two diametrically opposite abutments being fixed and the remaining abutments being adjustable to vary their circumferential thickness, four shoes lying between the abutments, four pivotally interconnected levers lying radially within the shoes, means for spreading the levers to expand them radially, and rollers engaging the levers and the central parts of the shoes to move the shoes out when the levers are spread.

12. A brake comprising a support, four abutments carried by the support, two diametrically opposite abutments being fixed and the remaining abutments being adjustable to vary their circumferential spacing, four shoes lying between the abutments, four pivotally interconnected levers lying radially within the shoes, means aligned with one of the fixed abutments connecting one of the pivots between the levers rigidly to the support, a cam diametrically opposite the last named means to spread the ends of the adjacent levers, and rollers engaging the central parts of the shoes and levers to move the shoes out when the levers are spread.

13. A brake comprising a support, four abutments carried by the support, two diametrically opposite abutments being fixed and the remaining abutments being adjustable to vary their circumferential spacing, four shoes lying between the abutments, four pivotally interconnected levers lying radially within the shoes, a plate, means adjustably mounting the plate on the support for circumferential movement, a pair of eccentrically adjustable pivots carried by the plate on which the ends of adjacent levers are pivoted, a cam on the support diametrically opposite to the plate engaging the ends of adjacent levers to spread the levers, and means connecting the central parts of the shoes and the levers to move the shoes outward when the levers are spread.

14. A brake comprising a support, four abutments carried by the support, two diametrically opposite abutments being fixed and the remaining abutments being adjustable to vary their circumferential spacing, four shoes lying between the abutments, four pivotally interconnected levers lying radially within the shoes, a plate, means adjustably mounting the plate on the support for circumferential movement, a pair of eccentrically adjustable pivots carried by the plate on which the ends of adjacent levers are pivoted, a cam on the support diametrically opposite to the plate engaging the ends of adjacent levers to spread the levers, rollers engaging the central parts of the levers and shoes, and interfitting parts on the rollers and the levers and shoes to prevent sliding of the rollers relative to the levers and shoes.

15. A brake comprising a support, three abutments carried by the support, three shoes lying between the abutments, three levers lying within the shoes, means forming a fixed pivotal mounting for the ends of two adjacent levers, an actuator engaging the end of one of said two levers and the adjacent end of the third lever, the other of said two levers and the other end of the third lever being pivotally connected, and means connecting the central parts of the shoes and the levers to move the shoes out when the actuator operates to spread the levers.

16. A brake comprising a support, three abutments carried by the support, three shoes lying between the abutments, three levers lying within the shoes, means forming a fixed pivotal mounting for the ends of two adjacent levers, an actuator engaging the end of one of said two levers and the adjacent end of the third lever, the other of said two levers and the other end of the third lever being pivotally connected, and means connecting the central parts of the shoes and the levers to move the shoes out when the actuator operates to spread the levers, at least two of the abutments being adjustable to vary their circumferential thickness thereby to adjust the released position of the shoes.

17. A brake comprising a support, three abutments carried by the support, three shoes lying between the abutments, three levers lying within the shoes; means forming a fixed pivotal mounting for the ends of two adjacent levers, an actuator engaging the end of one of said two levers and the adjacent end of the third lever, the other of said two levers and the other end of the third lever being pivotally connected, and rollers engaging the central parts of the shoes and the levers.

ADIEL Y. DODGE.

REFERENCES CITED

The following references are of record in the file of this patent:

UNITED STATES PATENTS

| Number | Name | Date |
|---|---|---|
| 1,663,147 | Spots | Mar. 20, 1928 |
| 1,789,957 | Connell | Jan. 27, 1931 |
| 1,937,691 | Girling | Dec. 5, 1933 |
| 2,046,806 | Baum et al. | July 7, 1936 |
| 2,168,959 | Lulay | Aug. 8, 1939 |
| 2,202,661 | Jeffery | May 28, 1940 |
| 2,271,815 | Cowell | Feb. 3, 1942 |
| 2,337,069 | Spiller et al. | Dec. 21, 1943 |
| 2,348,960 | Cowell | May 16, 1944 |
| 2,518,761 | Dodge | Aug. 15, 1950 |